United States Patent
Bade et al.

(10) Patent No.: US 7,752,458 B2
(45) Date of Patent: *Jul. 6, 2010

(54) METHOD AND SYSTEM FOR HIERARCHICAL PLATFORM BOOT MEASUREMENTS IN A TRUSTED COMPUTING ENVIRONMENT

(75) Inventors: Steven A. Bade, Georgetown, TX (US); Ryan Charles Catherman, Raleigh, NC (US); James Patrick Hoff, Raleigh, NC (US); William Lee Terrell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/258,332

(22) Filed: Oct. 24, 2008

(65) Prior Publication Data
US 2009/0049305 A1 Feb. 19, 2009

Related U.S. Application Data

(63) Continuation of application No. 10/835,503, filed on Apr. 29, 2004, now Pat. No. 7,480,804.

(51) Int. Cl.
*G06F 11/30* (2006.01)
(52) U.S. Cl. .................................... 713/189; 726/22

(58) Field of Classification Search .................. None
See application file for complete search history.

(56) References Cited

U.S. PATENT DOCUMENTS

| 7,222,062 | B2 | 5/2007 | Goud et al. | |
|---|---|---|---|---|
| 2003/0097558 | A1* | 5/2003 | England et al. | 713/155 |
| 2005/0177749 | A1* | 8/2005 | Ovadia | 713/201 |

* cited by examiner

*Primary Examiner*—Brandon S Hoffman
(74) *Attorney, Agent, or Firm*—Diana R. Gerhardt; Jack V. Musgrove

(57) ABSTRACT

An architecture for a distributed data processing system comprises a system-level service processor along with one or more node-level service processors; each are uniquely associated with a node, and each is extended to comprise any components that are necessary for operating the nodes as trusted platforms, such as a TPM and a CRTM in accordance with the security model of the Trusted Computing Group. These node-level service processors then inter-operate with the system-level service processor, which also contains any components that are necessary for operating the system as a whole as a trusted platform. A TPM within the system-level service processor aggregates integrity metrics that are gathered by the node-level service processors, thereafter reporting integrity metrics as requested, e.g., to a hypervisor, thereby allowing a large distributed data processing system to be validated as a trusted computing environment while allowing its highly parallelized initialization process to proceed.

12 Claims, 4 Drawing Sheets

METHOD AND SYSTEM FOR HIERARCHICAL PLATFORM BOOT MEASUREMENTS IN A TRUSTED COMPUTING ENVIRONMENT

CROSS-REFERENCE TO RELATED APPLICATION

This application is a continuation of U.S. patent application Ser. No. 10/835,503 filed Apr. 29, 2004, now U.S. Pat. No. 7,480,804.

BACKGROUND OF THE INVENTION

1. Field of the Invention

The present invention relates to an improved data processing system and, in particular, to a method and apparatus for data storage protection using cryptography.

2. Description of Related Art

Most data processing systems contain sensitive data and sensitive operations that need to be protected. For example, the integrity of configuration information needs to be protected from illegitimate modification, while other information, such as a password file, needs to be protected from illegitimate disclosure. As another example, a data processing system needs to be able to reliably identify itself to other data processing systems.

An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices.

The integrity of a data processing system's data and its operations, however, centers around the issue of trust. A data processing system's data and operations can be verified or accepted by another entity if that entity has some manner for establishing trust with the data processing system with respect to particular data items or particular operations.

Hence, the ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A trusted platform enables an entity to determine the state of the software environment in that platform and to seal data to a particular software environment in that platform. The entity deduces whether the state of the computing environment in that platform is acceptable before performing a transaction with that platform. To enable this, the trusted platform provides integrity metrics, also known as integrity measurements, to the entity that reflects the integrity of the software state of the trusted platform, and the integrity measurements require a root of trust within the computing platform. In order for a system to be a trusted platform, the integrity measurements must be taken from the Core Root of Trust for Measurements and extended through the initial program load (IPL) process up to the point at which the operating system is initialized.

A trusted platform module has been generally described in a platform-independent manner, but platform-specific descriptions have been created for certain classes of systems, such as personal computers (PC's). Existing hardware for trusted computing has focused on implementations for a single trusted platform module for a single system. This situation is sufficient for simple servers and PC's, which tend to be relatively low-performance computers that meet the needs of stand-along computational environments or client-side processing environments.

High-performance servers, though, typically have many central processing units, and these large systems have an IPL process that is highly parallel. Requiring the use of a single trusted platform module for integrity measurements within a distributed data processing system would prevent the use of a parallelized IPL process.

Therefore, it would be advantageous to have a mechanism for enabling a parallelized IPL process while providing a system-level integrity measurement using multiple trusted platform modules within a distributed data processing system.

SUMMARY OF THE INVENTION

A prior-art architecture for a distributed data processing system comprises a system-level service processor along with one or more node-level service processors, each of which is uniquely associated with distributed nodes within the distributed data processing system. With the present invention, these node-level service processors are extended to comprise any components that are necessary for operating the nodes as trusted platforms, such as a trusted platform module and a core root of trust for measurement (CRTM) in accordance with the security model of the Trusted Computing Group. These node-level service processors then inter-operate with the system-level service processor, which also contains any components that are necessary for operating the system as a whole as a trusted platform. The TPM within the system-level service processor aggregates the integrity metrics that are gathered by the node-level service processors, thereafter reporting integrity metrics as requested, e.g., to a hypervisor that is executing over the distributed data processing system. In this manner, the computational environment of a large distributed data processing system is able to be validated as a trusted computing environment while allowing the initialization of the distributed data processing system to proceed in a highly parallelized fashion.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DESCRIPTION OF THE PREFERRED EMBODIMENT(S)

In general, the devices that may comprise or relate to the present invention include a wide variety of data processing technology. Therefore, as background, a typical organization of hardware and software components within a distributed data processing system is described prior to describing the present invention in more detail.

Figure 1A:
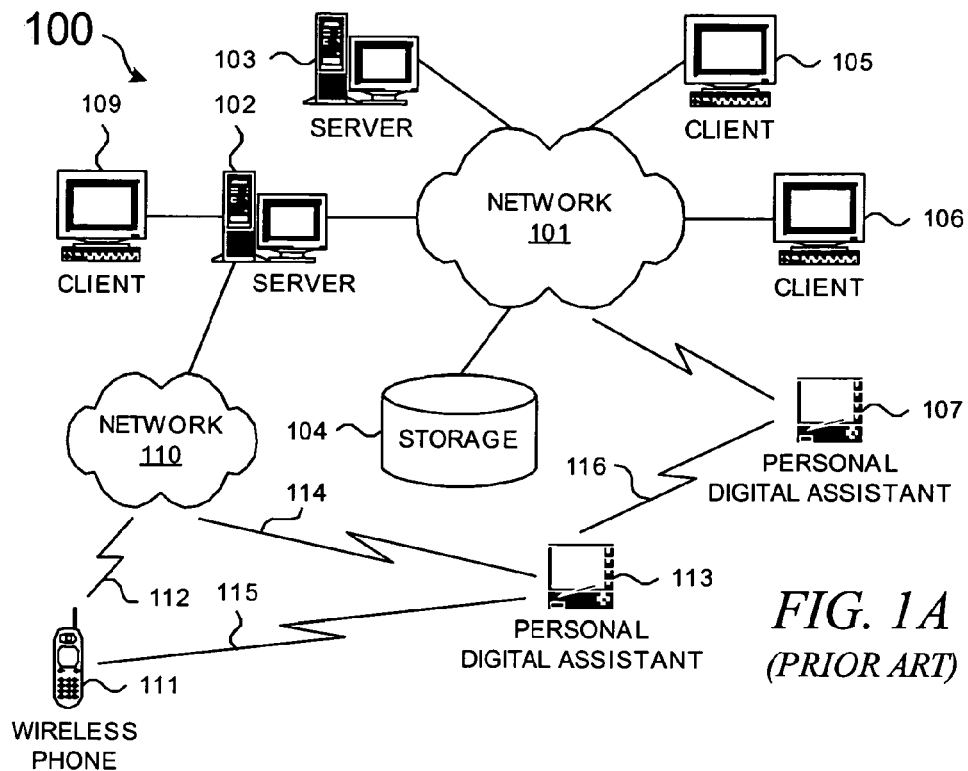
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

Figure 1B:
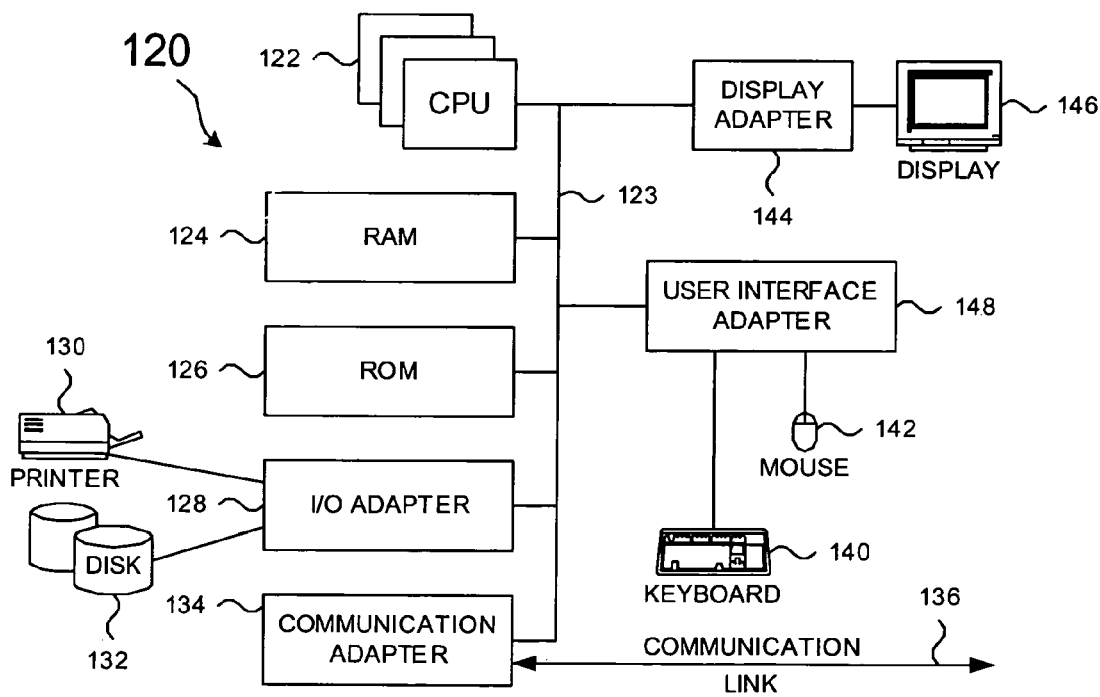
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

Figure 1C:
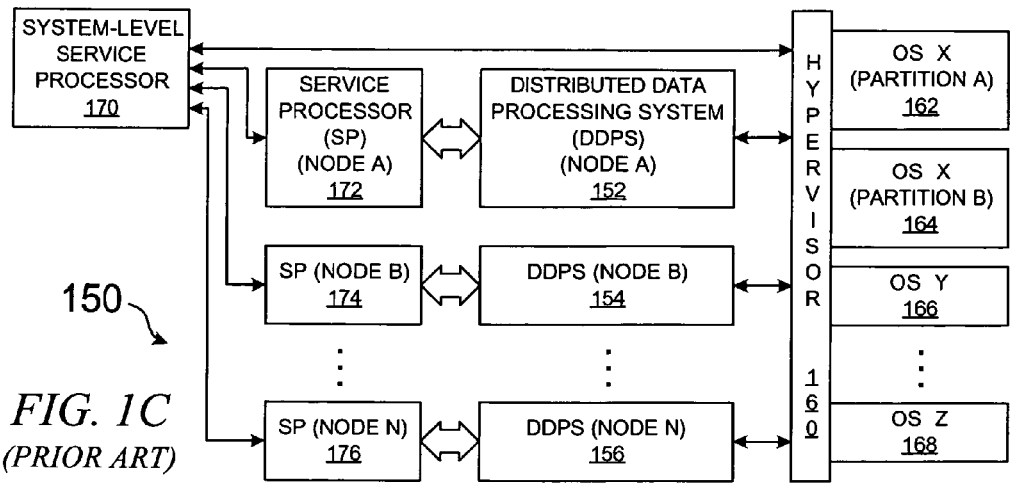
FIG. 1C depicts a block diagram that shows an example of a prior art distributed data processing system.

With reference now to FIG. 1C, a block diagram depicts an example of a prior art distributed data processing system. Distributed data processing system 150 contains multiple nodes 152-156, each of which may represent a single-processor or multi-processor device or card connected to a communication switch or a network; nodes 152-156 may be implemented as central electronic complex (CEC) units. Hypervisor 160 supports multiple instances of one or more operating systems and/or operating system partitions 162-168 on the shared computational resources of the distributed data processing nodes of system 150. Hypervisor 160 communicates with system-level service processor 170, which is responsible for booting system 150 and for monitoring the availability of the shared resources. Each distributed data processing node is associated with a service processor, e.g., service processors 172-176, each of which is responsible for booting its associated node and for assisting system-level service processor 170 in monitoring each of the nodes; a service processor may be associated with a node through a variety of physical connections to its associated node, e.g., the service processor's hardware card may attach to a PCI bus. It should be noted that each node may have a plurality of service processors, although only one service processor would be responsible for booting its associated node.

The present invention could be implemented on a variety of hardware platforms and computational environments; FIG. 1A, FIG. 1B, and FIG. 1C are intended as examples of a heterogeneous computing environment and not as architectural limitations for the present invention. In addition to being able to be implemented on a variety of hardware platforms and computational environments, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to trusted computing platforms. Before describing the present invention in more detail, though, some background information about trusted computing platforms is provided in FIG. 2 and FIG. 3 for evaluating the operational efficiencies and other advantages of the present invention. Although the present invention may be implemented in conjunction with a variety of trusted computing platforms, possibly in accordance with one or more standards, the examples of the present invention hereinbelow employ the terminology and examples from the standards and/or specifications that have been promulgated by the Trusted Computing Group (TCG); it should be noted, though, that the examples are not meant to imply architectural, functional, nor definitional limitations with respect to embodiments of the present invention.

Figure 2:
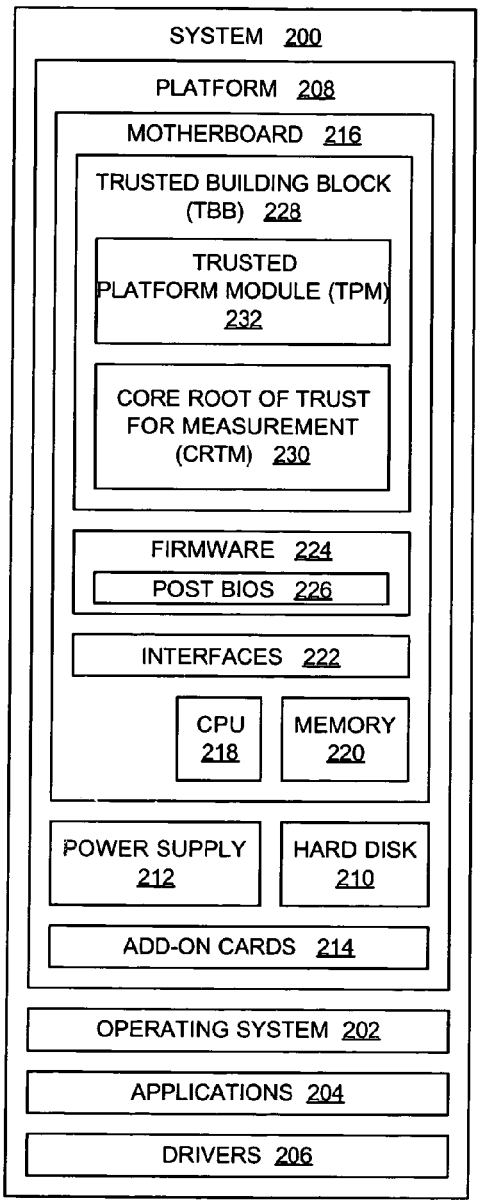
FIG. 2 depicts a block diagram that shows an example of a typical trusted platform architecture.

With reference now to FIG. 2, a block diagram depicts some of the components in a data processing system that is constructed using a model of a trusted platform architecture. Trusted platform architectures may be implemented for particular computational environments or for particular classes of devices; FIG. 2 depicts a trusted platform architecture in accordance with the TCG's PC-specific implementation specification.

System 200 supports execution of software components, such as operating system 202, applications 204, and drivers 206, on its platform 208. The software components may be received through a network, such as network 101 that is shown in FIG. 1A, or they may be stored, e.g., on hard disk 210. Platform 208 receives electrical power from power supply 212 for executing the software components on add-on cards 214 and motherboard 216, which includes typical components for executing software, such as CPU 218 and memory 220, although motherboard 216 may include multiple CPU's. Interfaces 222 connect motherboard 216, to other hardware components within system 200, and firmware 224 contains POST BIOS (power-on self-test basic input/output system) 226.

Motherboard 216 also comprises trusted building block (TBB) 228; motherboard 216 is supplied by a manufacturer with TBB 228 and other components physically or logically attached and supplied by the manufacturer. TBB 228 comprises the combination of the core root of trust for measurement (CRTM) component 230, the trusted platform module (TPM) 232, the connection of the CRTM to motherboard 216, and the connection of the TPM to motherboard 216.

TPM 232 is explained in more detail with respect to FIG. 3 hereinbelow. CRTM 230 is an immutable portion of the platform's initialization code that executes upon a platform reset; the platform's execution must begin at the CRTM upon any platform reset event. In this manner, the trust in the platform is based on the CRTM and the behavior of the TPM, and the trust in all measurements is based on the integrity of the CRTM. In the example that is shown in FIG. 2, the BIOS may be assumed to include a BIOS Boot Block and POST BIOS 226; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 2, the CRTM may be assumed to be the BIOS Boot Block, and the POST BIOS is a measured component of the chain of trust. Alternatively, the CRTM may comprise the entire BIOS.

Figure 3:
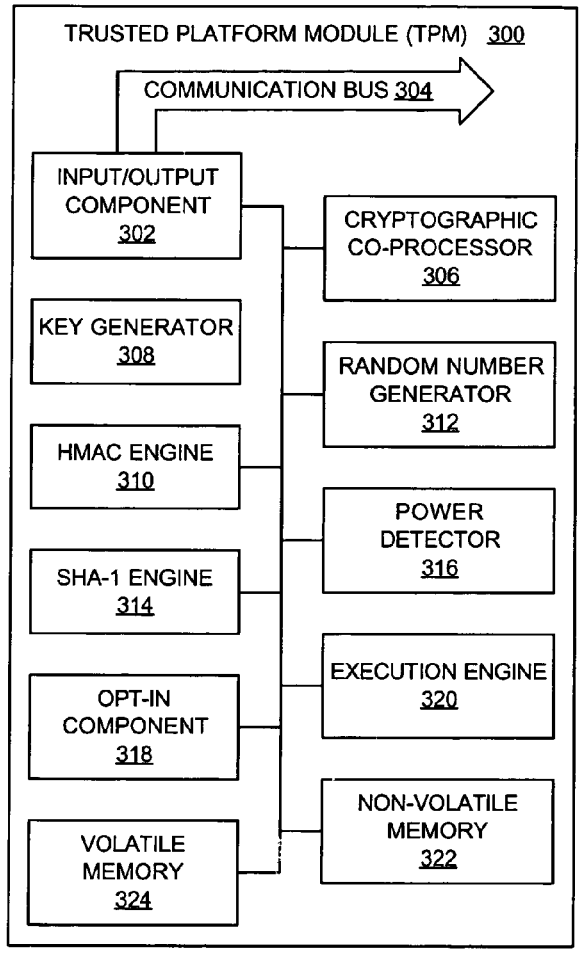
FIG. 3 depicts a block diagram that shows some of the major components of a typical trusted platform module.

With reference now to FIG. 3, a block diagram depicts some of the major components of a trusted platform module according to TCG specifications. Trusted platform module 300 comprises input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA asymmetric cryptographic key pairs. HMAC engine 310 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 312 acts as a source of randomness for the computation of various values, such as nonces, keys, or other values. SHA-1 engine 314 implements the SHA-1 hash algorithm. Power detector 316 manages the power states of a trusted platform module in association with the power states of the platform. Opt-in component 318 maintains the state of persistent and volatile flags and enforces semantics associated with those flags such that the trusted platform module may be enabled and disabled. Execution engine 320 runs program code to execute commands that the trust platform module receives through input/output component 302. Non-volatile memory 322 stores persistent identity and state associated with the trusted platform module; the non-volatile memory may store static data items but is also available for storing dynamic data items by entities that are authorized by the trusted platform module owner, whereas volatile memory 324 stores dynamic data items.

Given the background information on trusted computing platforms that has been described with respect to FIG. 2 and FIG. 3, a detailed description of the present invention is provided hereinbelow with respect to the remaining figures. As noted above, typical trusted platforms have been designed such that a single trusted platform module exists within a trusted platform architecture, which would require unacceptable restrictions in a high-performance server or similar distributed data processing system, such as system 150 that is shown in FIG. 1C. High-performance servers and other large systems have an initial program load (IPL) process or boot process that is highly parallelized. Requiring the use of a single trusted platform module for integrity measurements within a distributed data processing system would prevent the use of a parallelized IPL process. The present invention addresses this problem while providing a system-level integrity measurement, as explained in more detail hereinbelow.

Figure 4:
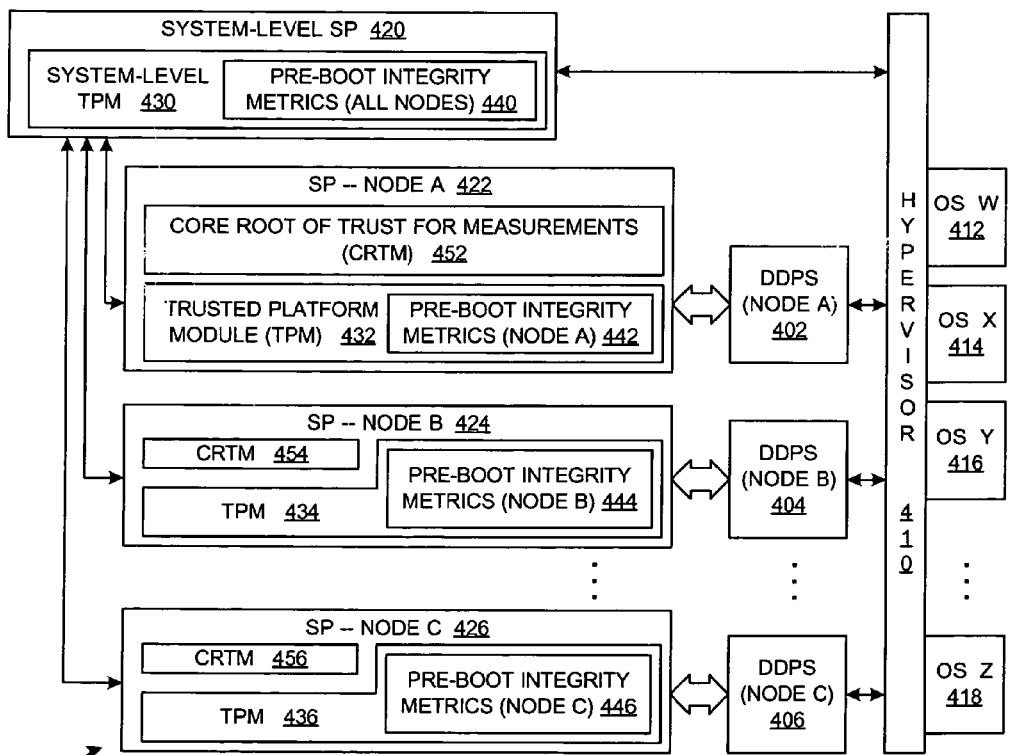
FIG. 4 depicts a block diagram that shows a particular architecture for a distributed data processing system that has been extended to include functionality for supporting trusted computing in accordance with an embodiment of the present invention.

With reference now to FIG. 4, a block diagram depicts a particular architecture for a distributed data processing system that has been extended to include functionality for supporting trusted computing in accordance with an embodiment of the present invention. In a manner similar to that described above with respect to FIG. 1C, distributed data processing system 400 contains multiple nodes 402-406, each of which may represent single-processor or multi-processor cards or devices connected by communication switches or networks. Hypervisor 410 supports multiple instances of one or more operating systems and/or operating system partitions 412-418 on the shared computational resources of the distributed data processing nodes of system 400. Hypervisor 410 communicates with system-level service processor 420, which is responsible for booting system 400 and for monitoring the availability of the shared resources. Each distributed data processing node is associated with a service processor, e.g., service processors 422-426, each of which is responsible for booting its associated node and for assisting system-level service processor 420 in monitoring each of the nodes.

Although a distributed data processing node may have more than one node-level service processor associated with it, the node-level service processors are uniquely associated with a node, i.e., a node-level service processor is associated with one and only one node; in such implementations, only one of the plurality of node-level service processors associated with a node is responsible for booting the associated node.

In contrast to system 150 that is shown in FIG. 1C, system 400 in FIG. 4 has been extended to include trusted platform modules. System-level service processor (SP) 420 includes system-level trusted platform module (TPM) 430, and node-level service processors 422-426 include node-level trusted platform modules 432-436, respectively. System-level trusted platform module 430 is able to store system-level pre-boot integrity measurements or metrics 440, which is a representation or combination of node-level pre-boot integrity measurements 442-446 from node-level trusted platform modules 432-436, respectively.

Each node-level service processor also comprises a core root of trust for measurement (CRTM), such as CRTM's 452-456 for node-level trusted platform modules 432-436, respectively. An integrity measurement is data that reflects the integrity of the software state on a trusted platform. A trusted platform starts execution from its core root of trust for measurement, thereby forming the basis or root for trusting the integrity of the software execution state within the trusted platform. The software that the CRTM loads and executes is measured and logged, thereby contributing to the trusted platform's integrity measurements. Each subsequent software element or configuration element is measured before execution control is passed; the collective chain of measurements represents the integrity of the trusted platform. A representation of an integrity measurement is stored within the trusted platform module in association with a log of every relevant event. The manner in which the trusted platform modules are used within distributed data processing system 400 is explained with respect to the process that is shown in FIG. 5.

Figure 5:
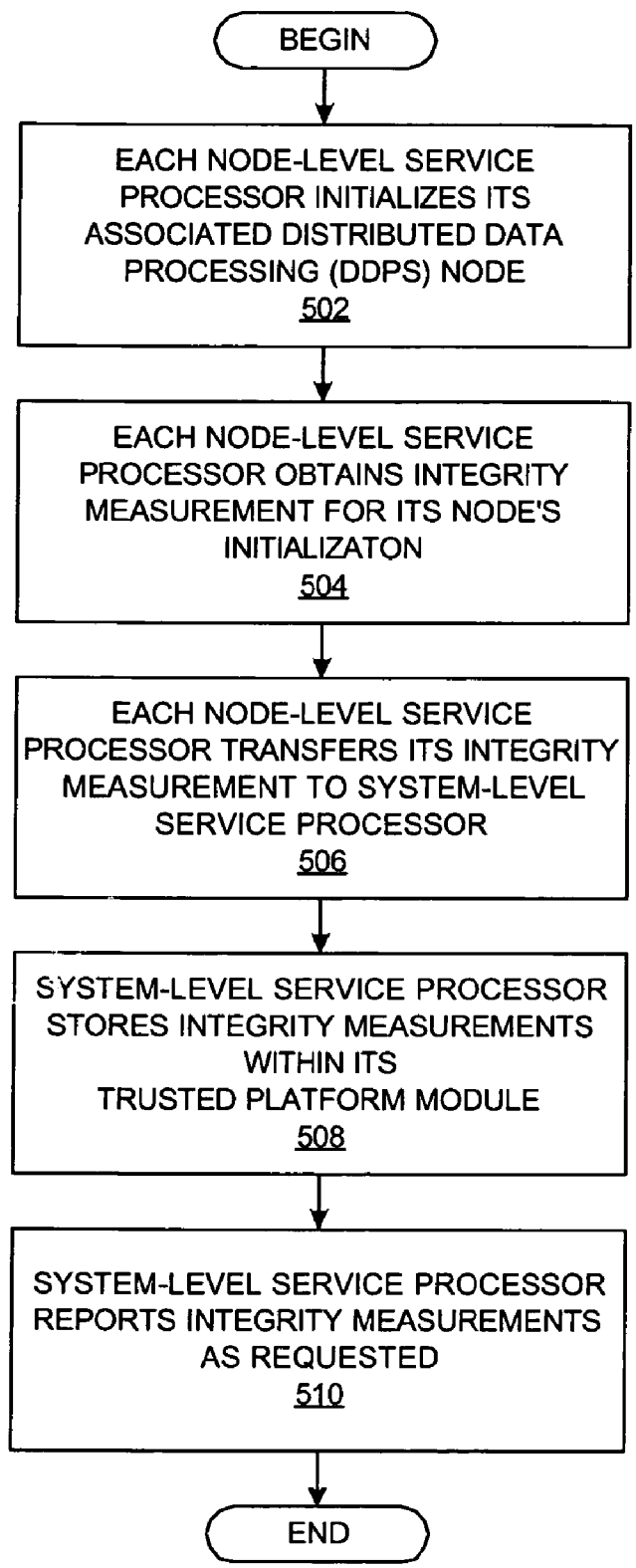
FIG. 5 depicts a process in which a distributed data processing system is able to perform a parallelized boot or IPL process while ensuring that the distributed data processing system can be validated as a trusted computing environment.

With reference now to FIG. 5, a flowchart depicts a process in accordance with an embodiment of the present invention in which a distributed data processing system is able to perform a parallelized boot or IPL process while ensuring that the distributed data processing system can be validated as a trusted computing environment. The process commences with each node-level service processor independently initializing its associated distributed data processing system node, starting from its respective CRTM (step 502), while obtaining integrity measurements (step 504); the initialization processes across the nodes occur approximately in parallel or occur relatively concurrently. In other words, each node is initialized in a manner similar to the well-known process for initializing a solitary trusted platform, such as that shown in FIG. 2, except that with the present invention, a node-level service processor is responsible for initializing the node using the CRTM, the TPM, and other trusted computing components that have been embedded in the service processor in accordance with the present invention. In a system architecture such as that shown in FIG. 1C, each service processor initializes its node to a state at which the hypervisor is running on each node. In a preferred embodiment in which each node subsequently supports a hypervisor within the distributed data processing system, a node-level service processor brings up each node to a state at which the hypervisor is running on the node while also obtaining integrity measurements; in other words, the integrity measurements that are obtained by each node-level service processor preferably includes a measure of trust for the starting of the hypervisor. At that point in time, the state of the node can be termed "pre-boot" as the system as a whole is still in its booting process.

After each node-level service processor has independently initialized its associated distributed data processing system node, each node-level service processor independently transfers its integrity measurement, e.g., preferably in the form of a digitally signed representation of its node's pre-boot environment along with its log, to the system-level service processor (step 506), which stores each of the pre-boot integrity metrics in the system-level trusted platform module (step 508). For example, as each node reports its metrics, an entry is made in the platform configuration register (PCR) and log of the system-level trusted platform module.

In this manner, the system-level trusted platform module maintains the overall pre-boot integrity measurements as the aggregate of all of the node-level service processor integrity metrics. The hypervisor is able to use the system-level trusted platform module for any of its measurements, such as loads of open firmware, creation of partitions, etc., using different PCR's within the system-level trusted platform module for the hypervisor-level measurements. When requested, the system-level service processor can report the integrity measurements to the hypervisor and/or its supported operating system instances/partitions (step 510), thereby completing the process.

The advantages of the present invention should be apparent in view of the detailed description that is provided above. With the present invention, an architecture for a distributed data processing system is extended to comprise any components that are necessary for operating multiprocessor nodes within the distributed data processing system as trusted platforms, e.g., using a TPM and a CRTM in accordance with the security model of the Trusted Computing Group. In this manner, the computational environment of a large distributed data processing system is able to be validated as a trusted computing environment while allowing the initialization of the distributed data processing system to proceed in a highly parallelized fashion.

It is important to note that while the present invention has been described in the context of a fully functioning data processing system, those of ordinary skill in the art will appreciate that the processes of the present invention are capable of being distributed in the form of instructions in a computer readable storage medium and a variety of other forms, regardless of the particular type of signal bearing storage media actually used to carry out the distribution. Examples of computer readable storage media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer program product on a computer readable storage medium for implementing a trusted computing environment within a distributed data processing system, wherein the distributed data processing system contains a system-level service processor and a plurality of nodes containing at least one computational processing unit, wherein each node is associated with at least one node-level service processor such that each node-level service processor is uniquely associated with one node, the computer program product comprising:

means for initializing a node by an associated node-level service processor commencing with a core root of trust for measurement (CRTM) within the node-level service processor;

means for obtaining an integrity measurement using the node-level service processor for the initialization of the node by collecting measurements for software loaded by the CRTM and for subsequently loaded software; and means for storing the integrity measurement in a trusted platform module on the node-level service processor; and means for transferring integrity measurements from the plurality of nodes to the system-level service processor.

2. The computer program product of claim 1 further comprising:

means for performing the means for initializing, the means for obtaining, and the means for storing relatively concurrently for the plurality of nodes.

3. The computer program product of claim 1 further comprising:

means for storing the integrity measurements from the plurality of nodes in a trusted platform module on the system-level service processor.

4. The computer program product of claim 3 further comprising:

means for generating an entry in a platform configuration register (PCR) and a log for the trusted platform module on the system-level service processor upon receipt of an integrity measurement from a node.

5. The computer program product of claim 1 further comprising:

means for reporting integrity measurements from the system-level service processor to a hypervisor.

6. The computer program product of claim 1 further comprising:

means for loading a hypervisor on the node during the initialization of the node such that the obtained integrity measurement includes the loading of the hypervisor on the node.

7. An apparatus for implementing a trusted computing environment within a distributed data processing system, wherein the distributed data processing system contains a system-level service processor and a plurality of nodes containing at least one computational processing unit, wherein each node is associated with at least one node-level service processor such that each node-level service processor is uniquely associated with one node, the apparatus comprising:

means for initializing a node by an associated node-level service processor commencing with a core root of trust for measurement (CRTM) within the node-level service processor;

means for obtaining an integrity measurement using the node-level service processor for the initialization of the node by collecting measurements for software loaded by the CRTM and for subsequently loaded software; and means for storing the integrity measurement in a trusted platform module on the node-level service processor; and means for transferring integrity measurements from the plurality of nodes to the system-level service processor.

8. The apparatus of claim 7 further comprising:

means for performing the means for initializing, the means for obtaining, and the means for storing relatively concurrently for the plurality of nodes.

9. The apparatus of claim 7 further comprising:

means for storing the integrity measurements from the plurality of nodes in a trusted platform module on the system-level service processor.

10. The apparatus of claim 9 further comprising:

means for generating an entry in a platform configuration register (PCR) and a log for the trusted platform module on the system-level service processor upon receipt of an integrity measurement from a node.

11. The apparatus of claim 7 further comprising:

means for reporting integrity measurements from the system-level service processor to a hypervisor.

12. The apparatus of claim 7 further comprising:

means for loading a hypervisor on the node during the initialization of the node such that the obtained integrity measurement includes the loading of the hypervisor on the node.

* * * * *